United States Patent Office 3,776,829
Patented Dec. 4, 1973

3,776,829
AMINATED CARBON FIBERS
John Cecil Goan, Johnson City, Tenn., assignor to Great Lakes Carbon Corporation, New York, N.Y.
No Drawing. Original application Feb. 27, 1970, Ser. No. 15,281, now abandoned. Divided and this application Oct. 26, 1971, Ser. No. 192,563
Int. Cl. B01k 1/00; D06m 11/14
U.S. Cl. 204—164                                       1 Claim

ABSTRACT OF THE DISCLOSURE

Carbon fibers are reacted with ammonia plasma to form amino groups on the surface, useful in preparing carbon fiber-epoxy resin composite.

CROSS REFERENCE TO RELATED APPLICATIONS

This application is a division of pending application Ser. No. 15,281, filed Feb. 27, 1970, now abandoned.

BACKGROUND OF THE INVENTION

Composite materials, for use in the aerospace industry, are well known to the art. Such materials comprise a resinous binder, as for example a polymerized epoxide and a filler, as for example asbestos, glass fibers, or carbon fibers.

Of the above named fillers, carbon fibers have received attention due to their high corrosion and temperature resistance, low density, high tensile strength and high modulus of elasticity.

Uses for such carbon-fiber reinforced composites include aerospace structural components, rocket motor casings, deep submergence vehicles, and ablative materials for heat shields on re-entry vehicles.

The incorporation of carbon or graphite particles in resin bases in amounts of up to 60 percent by volume will impart a heat-conducting property but not an electrical conductivity to the component. Litant, in U.S. 3,406,126, teaches the addition of carbon yarn in as little as 0.05 percent by volume to the resinous matrix to impart electrical conductivity to the resulting composite. Such composites can be prepared from polyesters, polyvinyl chloride, polyepoxides, or like resins, and carbonized rayon, polyacrylonitrile, or like fibers.

High modulus composites usually have low interlaminar shear strengths of about 3000 to 4000 p.s.i. The low shear strengths are probably due to poor bonding between the carbon fibers and the matrix. Attempts to improve this bonding, particularly between rayon-based carbon fiber fillers and an epoxy-matrix have been partially successful, but have resulted in a degradation of the ultimate tensile strength of the fiber and also of the fabricated composite.

Improved bonding has been accomplished by plating the fiber with various metals, as for example tantalum, with metal carbides, as for example whiskers of silicon carbide, and with nitrides.

More recently, rayon-based carbon fibers have been treated with various oxidizing agents in order to etch the surface of the fiber. Such oxidizing agents have included air, ozone, concentrated nitric acid, and a 3.3 percent by weight solution of sodium dichromate in concentrated sulfuric acid at 50° C. for 5 minutes. In most cases the oxidative treatment of rayon-based carbon fibers resulted in a decrease in ultimate tensile strength of the fiber and of the fiber-resin composite.

The primary structural properties of fiber-resin composites improves as carbon fiber content is increased up to about 65 volume percent then decreases as the fiber content exceeds that aforementioned figure. The preferred range of carbon fiber content is about 45 to 65 volume percent of fiber in the fabricated composite.

SUMMARY OF THE INVENTION

This invention relates to carbon fibers containing amine functional groups on the surface thereof. The amine groups act as cross linking agents for an epoxy resin matrix in the preparation of sized fibers, pre-impregnated tapes, and composites containing the fibers.

The carbon fibers of this invention are prepared by contacting the carbon fiber with an ammonia plasma.

DETAILED DESCRIPTION OF THE INVENTION

High modulus carbon fibers are particularly useful for this invention since such fibers have primary structural properties well adapted for structural uses. However, this invention, as herein described and claimed, is not limited thereto and can be used for all carbon fibers.

High modulus acrylic-based carbon fibers are defined as those fibers possessing a tensile strength of greater than $100 \times 10^3$ p.s.i. and a Young's modulus greater than $20 \times 10^6$ p.s.i. Such fibers can be prepared by the method of Shindo, "Studies in Graphite Fiber, Report No. 317 of the Government Research Industrial Institute," Osaka, Japan, 1961, and Tsunoda, U.S. 3,285,686. Typically, acrylic-fibers can be stretched to about 50 to 100 percent or more of their original length while heating in the presence of water or steam to about 100° C., oxidized in an oxidizing atmosphere at about 200 to 300° C. for a period of up to 4 hours, oxidized in a second stage in an oxidative atmosphere at 200 to 375° C., and pyrolyzed and/or graphitized at 1000 to 3000° C. in a non-oxidizing atmosphere to prepare a carbon fiber possessing a high modulus of elasticity and a high tensile strength.

By the process of this invention the carbon fibers as prepared above are contacted with a plasma of ammonia to yield a new carbon fiber with an aminated surface. The ammonia plasma can be formed by charging a tube containing the fiber with ammonia gas at an absolute pressure of about 0.05 to about 2 torr (mm. Hg) and passing therethrough an electric discharge of from about 10 to about 100 megahertz for from about 15 minutes to about 3 hours. A power level of 10 to 500 watts is generated in the plasma. The treated carbon fiber is then removed from the tube and can be used without further manipulation to prepare epoxy-sized fibers, and pre-impregnated tapes and composites with an epoxy matrix. The amine functions catalyze the curing of the resin and bond thereto providing a direct chemical linkage between fiber and matrix.

Typically, graphitized fiber and ammonia are charged into the tube of a crystal-controlled RF generator— LTA-600 J (Tracerlab, a Division of Laboratory for Electronics, Inc.) at an internal pressure of 0.15 torr. A discharge of 13.56 megahertz is passed through the tube for 1.5 hours. The vacuum is released and the fiber is removed.

Alternatively, the excitation of the ammonia is achieved by employing a microwave source for preparing the ammonia plasma.

The aminated carbon fiber of this invention is incorporated in amounts of about 45 to about 65 percent by volume in an epoxy resin without the further addition of a catalyst and polymerized in a manner well known in the art to give a void free composite. Exemplification of this method has been provided by Rees, U.S. 3,276,931, and Warner, U.S. 3,281,300.

Resins useful for preparing the composites utilizing the treated carbon fibers of this invention are those which will bond to amine functions during curing. They include such resins as epoxy resins, polyimide resins, poly-lower alkylene resins as for example polyethylene and polypropylene resins.

The physical properties of the prepared composite including tensile, compression, and shear strengths are measured by methods also well known in the art. More specifically, in order to prepare test composites, the fiber is wound onto a 7 inch diameter drum which drum contains an exterior 0.005 inch Teflon sheet coating. A transverse guide is driven at a constant rate based on yarn diameter to provide parallel alignment of the yarn without void or overlap of the fibers. While winding, a solution of 38 weight percent epoxy resin (Shell Epon 826), 12 weight percent meta-phenylenediamene (E. J. du Pont de Nemours), and 50 weight percent anhydrous methyl ethyl ketone in an amount 2–2½ times that required for the composite is added to the winding and the mandrel is heated to provide a surface temperature of 75° C. in order to effect a precure or B-stage in the resin system and evaporate the excess solvent. The additional material is provided to permit adequate flow and bleed-out. Winding is continued until a single layer of composite has been accumulated on the drum. The resulting composite is cut transversely, pulled from the drum, and spread flat on Teflon sheeting to provide a B-stage tape. Such tape is cut into appropriately dimensioned segments and the segments are stacked into a Teflon-lined mold, aligning the fibers, until an amount needed to form a 0.12 inch thick composite bar has been accumulated. The mold containing the stacked tapes is placed in a heated-platen press, held under a pressure of 5 millimeters of mercury for one hour, then heated at 100° C. for 2 hours under a pressure of 300 p.s.i.g. at 200° for one hour under the same pressure to effect cure.

The cured composite is tested for flexural strength, flexural modulus, tensile strength, tensile modulus, volume percent of fiber, shear strength, and density. A sample composite bar is loaded in a three-point configuration on a 2 inch span (the supports and loading surfaces being the radial faces of 0.5 inch diameter steel pins). Stress is applied until failure, giving a linear stress-strain curve from which the flexural strength and flexural modulus of the composite can be calculated. A second sample of the composite is loaded in a three-point configuration on 0.4 inch centers consisting of the radial surfaces of 0.375 inch diameter steel pins, providing a length to depth ratio of 3.3:1. The bar is flexed to failure. Depending upon the tensile properties of the reinforcing yarn and the quality of the resin matrix to graphite yarn interfacial bonding, three predominate modes of failure are noted. A transverse (tensile) failure showing a sharp peak in the stress-strain curve at the failure point results from high shear properties in conjunction with relatively lower tensile strength properties of the yarn. Shear strength values obtained with transverse failure of this type are not true indications of shear strength but are minimum values since the tensile strength of the bar failed before a true shear failure values is attained. Low shear strength bars fail parallel to the long dimension of the sample. Complex failures consisting of a combination of the above two types are obtained in samples of intermediate shear strength.

Composite flexural strength and modulus, and shear strength parallel to the line of fibers is superior in composites containing the amine fibers of this invention.

What is claimed is:

1. A method for aminating the surface of a carbon fiber which comprises contacting the fiber for 15 minutes to 3 hours with ammonia plasma generated by an electric discharge of from about 10 to about 100 megahertz at a pressure of about 0.05 to about 2 torr generating a power level of about 10–500 watts in the plasma.

References Cited
UNITED STATES PATENTS

| | | | |
|---|---|---|---|
| 3,179,605 | 4/1965 | Ohsol | 23—209.1 F |
| 3,297,405 | 1/1967 | Sperk et al. | 23—209.1 F |
| 3,479,151 | 11/1969 | Gutzeit | 23—209.1 F |
| 3,607,063 | 9/1971 | Douglas et al. | 23—209.3 |
| 3,634,220 | 1/1972 | Goan | 204—164 |

FREDERICK C. EDMUNDSON, Primary Examiner

U.S. Cl. X.R.

8—Acrylo Digest; 23—447, 460